US009001106B2

(12) United States Patent
Choi et al.

(10) Patent No.: US 9,001,106 B2
(45) Date of Patent: Apr. 7, 2015

(54) DISPLAY APPARATUS

(75) Inventors: Uk Chul Choi, Cheonan-si (KR); Cheol Woo Park, Suwon-si (KR); Hyun Sik Hwang, Ansan-si (KR); Yongjun Jang, Yongin-si (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 424 days.

(21) Appl. No.: 13/414,116

(22) Filed: Mar. 7, 2012

(65) Prior Publication Data

US 2013/0076722 A1 Mar. 28, 2013

(30) Foreign Application Priority Data

Sep. 27, 2011 (KR) ........................ 10-2011-0097714

(51) Int. Cl.

| | |
|---|---|
| ***G06F 3/038*** | (2013.01) |
| ***G09G 5/00*** | (2006.01) |
| ***G09G 3/36*** | (2006.01) |
| ***G09G 5/10*** | (2006.01) |
| ***G09G 3/34*** | (2006.01) |

(52) U.S. Cl.

CPC ............ *G09G 3/348* (2013.01); *G09G 2300/08* (2013.01); *G09G 2310/0251* (2013.01); *G09G 2310/027* (2013.01)

(58) Field of Classification Search

CPC .......... G09G 2330/021; G09G 3/3696; G09G 2330/02; G09G 2320/041; G09G 3/3648; G09G 3/3688; G09G 2340/0428; G09G 2320/0276; G09G 2360/16; G09G 2320/0626

USPC ..................... 345/212, 214, 3.2, 89, 147, 690

See application file for complete search history.

(56) References Cited

U.S. PATENT DOCUMENTS

| | | | | |
|---|---|---|---|---|
| 2001/0009411 | A1* | 7/2001 | Kusanagi | 345/93 |
| 2002/0000970 | A1* | 1/2002 | Akimoto et al. | 345/100 |
| 2007/0285365 | A1* | 12/2007 | Lee | 345/87 |
| 2008/0225024 | A1* | 9/2008 | Ito | 345/204 |
| 2008/0278433 | A1* | 11/2008 | Lee et al. | 345/107 |
| 2010/0039425 | A1* | 2/2010 | Chen et al. | 345/214 |
| 2010/0091007 | A1* | 4/2010 | Yoon et al. | 345/213 |
| 2010/0164619 | A1 | 7/2010 | Kim et al. | |
| 2011/0090198 | A1* | 4/2011 | Hsueh et al. | 345/211 |

FOREIGN PATENT DOCUMENTS

| | | |
|---|---|---|
| JP | 2008-252875 | 10/2008 |
| KR | 1020040037830 | 5/2004 |
| KR | 1020040093877 | 11/2004 |
| KR | 1020060126270 | 12/2006 |
| KR | 1020070083083 | 8/2007 |
| KR | 1020100028677 | 3/2010 |

* cited by examiner

*Primary Examiner* — Aneeta Yodichkas

(74) *Attorney, Agent, or Firm* — F. Chau & Associates, LLC

(57) ABSTRACT

A display apparatus includes a display panel, a gate driver, and a data driver. The display panel includes a plurality of gate lines, a plurality of data lines, and a plurality of pixels connected to the gate lines and the data lines to display an image. The gate driver is configured to apply a gate signal to the gate lines and the data driver is configured to apply a data signal to the data lines. At least one intermediate voltage having a voltage level between a first voltage and a second voltage and a data voltage corresponding to a specific gray scale are sequentially applied to at least one pixel of the pixels as the data signal during a frame period.

12 Claims, 11 Drawing Sheets

DISPLAY APPARATUS

CROSS-REFERENCE TO RELATED APPLICATION

This application claims priority under 35 U.S.C. §119 to Korean Patent Application No. 10-2011-0097714 filed on Sep. 27, 2011, the disclosure of which is incorporated by reference herein in its entirety.

TECHNICAL FIELD

The present invention relates to a display apparatus, and more particularly, to a display apparatus having improved driving characteristics.

DISCUSSION OF THE RELATED ART

An electrowetting display apparatus displays images by controlling the intensity and wavelength band of light that passes through each pixel using a principle in which the wetting characteristics of a surface may be changed according to a voltage applied to a fluid.

The electrowetting display apparatus does not employ a polarizing plate, and thus, may improve transmittance and reflectance when compared with a liquid crystal display. In addition, such display devices using electrowetting have low power consumption and fast response speeds.

Various display apparatuses, such as the electrowetting display, a liquid crystal display, plasma display, field effect display, and electrophoretic display, may include a display panel, a gate driver for applying a gate signal to the display panel, and a data driver for applying a data signal to the display panel.

However, when using a high voltage as the data signal, the data driver may be overloaded, thereby deteriorating its driving property. Accordingly, there is a need to improve the driving characteristics of a data driver.

SUMMARY

Exemplary embodiments of the present invention provide a display apparatus having improved driving characteristics.

According to an exemplary embodiment of the present invention, a display apparatus includes a display panel, a gate driver, and a data driver.

The display panel includes a plurality of gate lines, a plurality of data lines, and a plurality of pixels connected to the gate lines and the data lines to display an image. The gate driver is configured to apply a gate signal to the gate lines and the data driver is configured to apply a data signal to the data lines.

At least one intermediate voltage having a voltage level between a first voltage and a second voltage and a data voltage corresponding to a specific gray scale are sequentially applied to at least one pixel of the pixels as the data signal during a frame period.

The intermediate voltage includes a first intermediate voltage.

The intermediate voltage further includes a second intermediate voltage and a third intermediate voltage.

A voltage level of the first intermediate voltage is about equal to an average voltage level of the first and second voltages, a voltage level of the second intermediate voltage is about equal to an average voltage level of the first voltage and the first intermediate voltage, and a voltage level of the third intermediate voltage is about equal to an average voltage level of the second voltage and the first intermediate voltage.

The data driver includes a data processing part and a switch part and the switch part comprises a first switch connected between a terminal that receives the first intermediate voltage and a corresponding data line of the data lines.

The switch part further includes: a second switch connected between a terminal that receives the second intermediate voltage and the corresponding data line; and a third switch connected between a terminal that receives the third intermediate voltage and the corresponding data line.

A first pixel and a second pixel of the pixels are sequentially connected to the corresponding data line, and the switch part applies at least one of the first, second, or third intermediate voltages to the second pixel using the first, second, or third switches when at least one of the first, second, or third intermediate voltages has a voltage level between a voltage level of a data voltage applied to the first pixel and a voltage level of a data voltage to be applied to the second pixel.

When at least two voltages of the first, second, and third intermediate voltages are applied to the second pixel, the at least two voltages are applied in the order of their voltage levels.

The switch part includes: a reset switch connected to a terminal that receives the first voltage and the corresponding data line; and an output switch connected to the data processing part and the corresponding data line.

The display apparatus further includes a timing controller configured to receive image signals and control signals from an external device and apply a gate control signal to the gate driver and a data control signal and the image signals to the data driver.

The data processing part includes: a shift register configured to receive the data control signal and output a sampling signal; an input register configured to receive the sampling signal, sequentially store the image signals and simultaneously output those image signals corresponding to a line of the display panel; a latch configured to store and output the image signals corresponding to the line; a level shifter configured to convert voltage levels of the image signals corresponding to the line and output the converted image signals; a digital-to-analog converter configured to receive a gamma reference voltage and the converted image signals and output data voltages corresponding to the converted image signals; and an output buffer configured to receive and output the data voltages.

The display panel includes: a first substrate on which the gate lines, the data lines, and the pixels are disposed; a second substrate facing the first substrate; and a fluid layer including a first fluid layer and a second fluid layer, which are disposed between the first substrate and the second substrate and at least one of the first and second fluids has a color.

Each of the pixels includes: a switching device connected to a corresponding gate line of the gate lines and a corresponding data line of the data lines; and a pixel electrode connected to the switching device.

The second substrate includes a common electrode facing the pixel electrode, the pixel electrode receives the data signal through the switching device, and the common electrode receives the first voltage.

The intermediate voltage includes: a first intermediate voltage having a voltage level between the first voltage and a reference voltage, wherein the reference voltage has a voltage level about equal to an average voltage level of the first and second voltages; and a second intermediate voltage having a voltage level between the reference voltage and the second voltage.

The voltage level of the first intermediate voltage is about equal to an average voltage level of the first voltage and the reference voltage and the voltage level of the second intermediate voltage is about equal to an average voltage level of the second voltage and the reference voltage.

The display panel includes: a first substrate on which the gate lines, the data lines, and the pixels are disposed; a second substrate facing the first substrate and including a common electrode that receives the reference voltage; and a fluid layer disposed between the first substrate and the second substrate and including a first fluid layer having a color and a transparent second fluid layer, wherein each of the pixels includes: a switching device connected to a corresponding gate line of the gate lines and a corresponding data line of the data lines; and a pixel electrode connected to the switching device and facing the common electrode to form an electric field.

According to an exemplary embodiment of the present invention, a display apparatus includes a display panel, a gate driver, and a data driver.

The display panel includes a plurality of gate lines, a plurality of data lines, and a plurality of pixels connected to the gate lines and the data lines to display an image. The gate driver is configured to apply gate signals to the gate lines and the data driver is configured to apply data signals to the data lines. The data driver applies a first data signal to a first pixel of at least two pixels that are connected to the same data line in a first part of a first data input period of the first pixel and applies a second data signal to the first pixel in a second part of the data input period of the first pixel, wherein the first and second data signals have different voltage levels.

The data driver includes a data processing part and a switch part and the switch part includes an output switch connected between the data processing part and the data lines.

The data driver applies a third data signal to a second pixel of the at least two pixels that are connected to the same data line in a first part of a data input period of the second pixel and applies a fourth data signal to a second pixel in a second part of the data input period of the second pixel, wherein the third and fourth data signals have different voltage levels.

According to an exemplary embodiment of the present invention, a display apparatus includes a display panel including a plurality of gate lines, a plurality of data lines, and a plurality of pixels connected to the gate lines and the data lines; and a data driver connected to the data lines, wherein the data driver includes a buffer and a switch part, the switch part including an output switch and at least one intermediate data voltage switch, and wherein the at least one intermediate data voltage switch is turned on to provide an intermediate data voltage to a pixel in a first part of a data input period of the pixel and the output switch is turned on in a second part of the data input period to provide a full data voltage to the pixel.

BRIEF DESCRIPTION OF THE DRAWINGS

The above and other features of the present invention will become more apparent by describing in detail exemplary embodiments thereof with reference to the accompanying drawings in which.

DETAILED DESCRIPTION OF EXEMPLARY EMBODIMENTS

Exemplary embodiments of the present invention will be described more fully hereinafter with reference to the accompanying drawings. However, the present invention may be embodied in various different ways and should not be construed as limited to the exemplary embodiments described herein.

It will be understood that when an element or layer is referred to as being "on," "connected to" or "coupled to" another element or layer, it can be directly on, connected or coupled to the other element or layer or intervening elements or layers may be present. Like numbers may refer to like elements throughout the specification and drawings.

As used herein, the singular forms, "a," "an" and "the" are intended to include the plural forms as well, unless the context clearly indicates otherwise.

Figure 1:
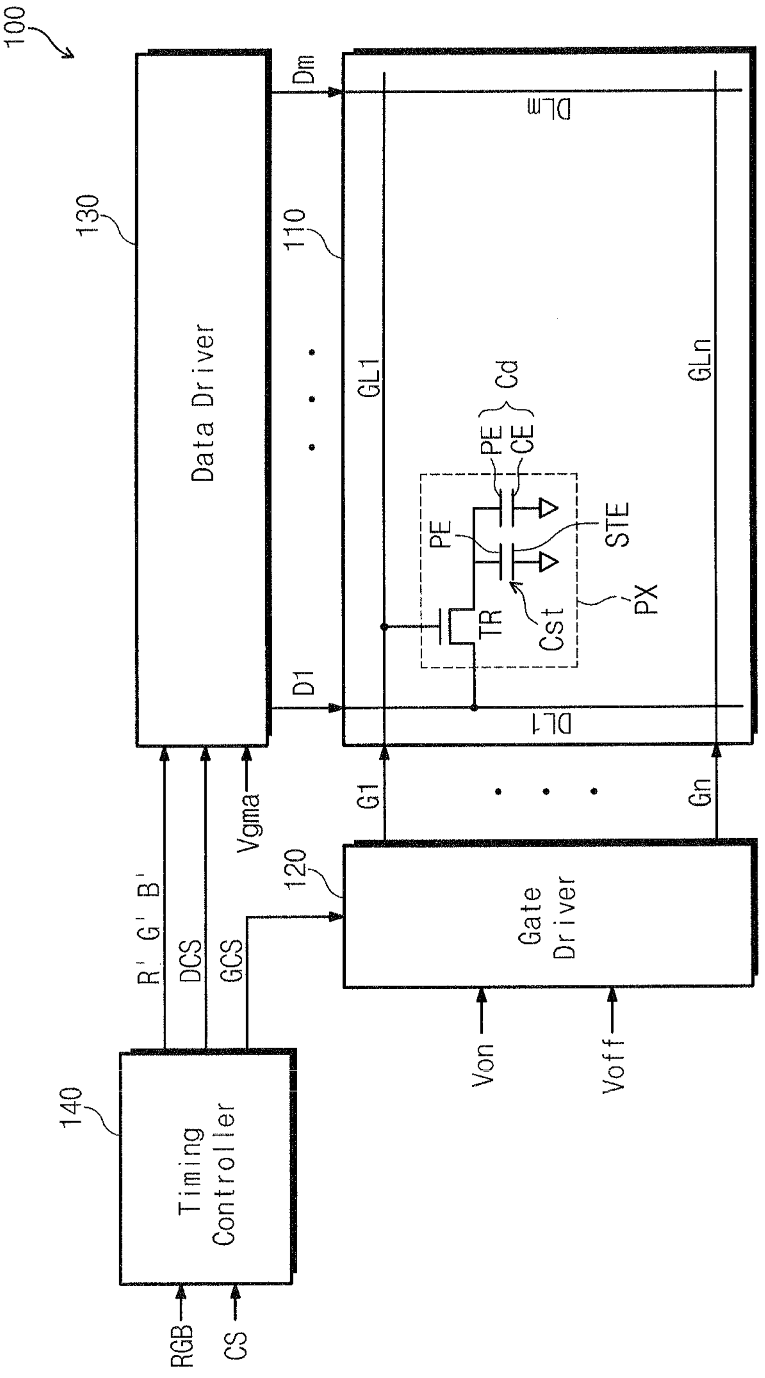
FIG. 1 is a block diagram showing a display apparatus according to an exemplary embodiment of the present invention.

FIG. 1 is a block diagram showing a display apparatus according to an exemplary embodiment of the present invention.

Referring to FIG. 1, a display apparatus 100 includes a display panel 110, a gate driver 120, a data driver 130, and a timing controller 140.

The timing controller 140 receives image signals RGB and control signals CS from an external device (not shown). The RGB image signals may correspond to the colors red, green and blue. The timing controller 140 converts a data format of the image signals RGB into a data format appropriate for an interface between the data driver 130 and the timing controller 140 and applies the converted image signals R'G'B' to the data driver 130. In addition, the timing controller 140 applies data control signals DCS, such as a data start signal STH, a data synchronization signal CPH, a load signal TP, a switch control signal SCS, etc., to the data driver 130.

The timing controller 140 applies gate control signals GCS, such as a vertical start signal, a vertical clock signal, a vertical clock bar signal, etc., to the gate driver 120.

The gate driver 120 sequentially outputs gate signals G1 to Gn in response to the gate control signals GCS from the timing controller 140. The gate signals G1 to Gn may include a gate on voltage Von and a gate off voltage Voff.

The data driver 130 converts the image signals R'G'B' into data signals D1 to Dm in response to the data control signals DCS from the timing controller 140. The data signals D1 to Dm are applied to the display panel 110.

The display panel 110 includes a plurality of gate lines GL1 to GLn, a plurality of data lines DL1 to DLm crossing the gate lines GL1 to GLn, and a plurality of pixels PX.

In the present exemplary embodiment, the pixels PX may have the same structure and function, and thus only one pixel PX has been shown in FIG. 1 as a representative example.

Each pixel PX includes a thin film transistor TR, a display capacitor Cd, and a storage capacitor Cst. The display capacitor Cd includes a pixel electrode PE and a common electrode CE and the storage capacitor Cst includes the pixel electrode PE and a storage electrode STE. According to an exemplary embodiment of the present invention, the storage electrode STE may be omitted.

The thin film transistor TR includes a gate electrode GE connected to a corresponding gate line of the gate lines GL1 to GLn, a source electrode SE connected to a corresponding data line of the data lines DL1 to DLm, and a drain electrode DE connected to the display capacitor Cd and the storage capacitor Cst.

The gate lines GL1 to GLn are connected to the gate driver 120 to receive the gate signals G1 to Gn. The data lines DL1 to DLm are connected to the data driver 130 to receive the data signals (also referred to hereinafter as data voltages) D1 to Dm provided from the data driver 130.

The thin film transistor TR in each pixel PX is turned on in response to the gate signal applied through the corresponding gate line, and the data voltage applied to the corresponding data line is applied to the pixel electrode PE through the turned-on thin film transistor TR. In addition, the common electrode CE facing the pixel electrode PE is applied with a first reference voltage.

Although not shown in FIG. 1, in the case that the display apparatus 100 is a transmissive-type display or a transflective-type display, the display apparatus 100 may further include a backlight unit disposed adjacent to the display panel 110 to provide light to the display panel 110. The backlight unit may include a plurality of light sources, such as a light emitting diode (LED), a cold cathode fluorescent lamp (CCFL), etc.

Figure 2:
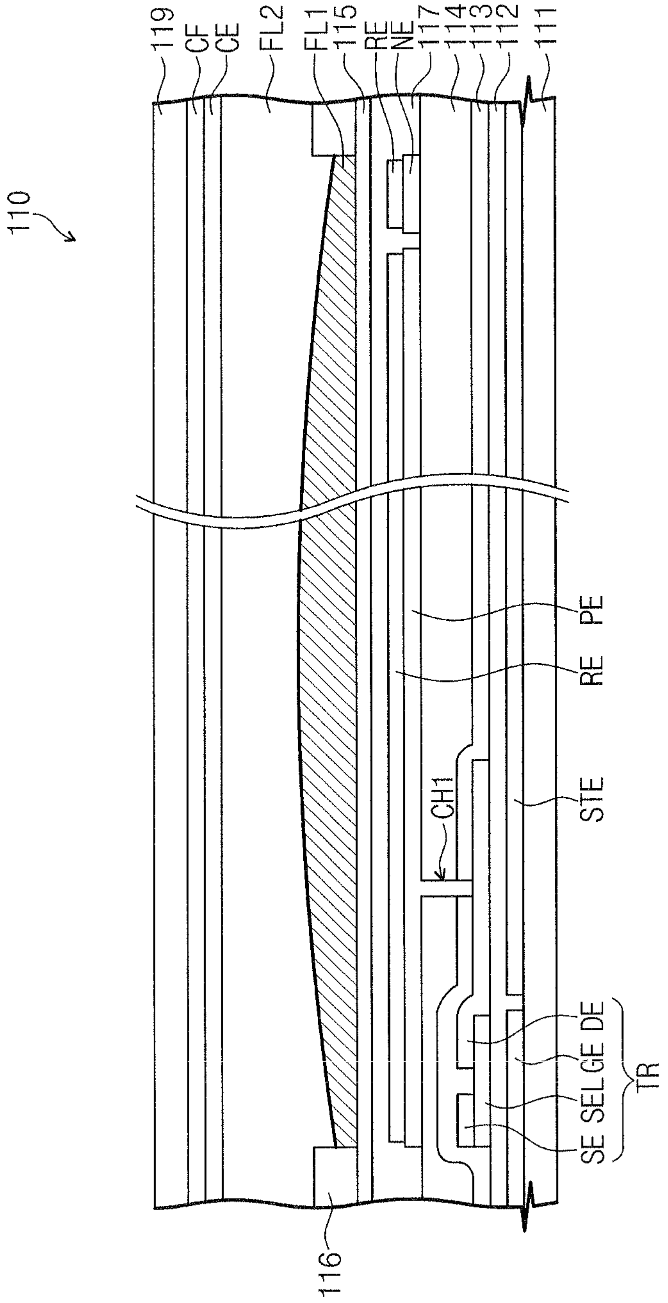
FIG. 2 is a cross-sectional view showing a pixel area in a display panel shown in FIG. 1, according to an exemplary embodiment of the present invention.

FIG. 2 is a cross-sectional view showing a pixel area in the display panel 110 shown in FIG. 1, according to an exemplary embodiment of the present invention.

Referring to FIG. 2, the display panel 110 includes a first base substrate 111 and a second base substrate 119 facing the first base substrate 111. The first and second base substrates 111 and 119 may be formed of various materials, such as polyethylene terephthalate (PET), fiber reinforced plastic (FRP), polyethylene naphthlate (PEN), etc.

The gate electrode GE of the thin film transistor TR and the storage electrode STE of the storage capacitor Cst are disposed on the first base substrate 111. A gate insulating layer 112 is disposed on the first base substrate 111 to cover the gate electrode GE and the storage electrode STE.

A semiconductor layer SEL is disposed on the gate insulating layer 112. Although not shown in FIG. 2, the semiconductor layer SEL may include an active layer or an ohmic contact layer.

The source electrode SE and the drain electrode DE of the thin film transistor TR are disposed on the gate insulating layer 112 and the semiconductor layer SEL to be spaced apart from each other. The source electrode SE and the drain electrode DE are covered by a protective layer 113 and a second insulating layer 114 is disposed on the protective layer 113. Although not shown in FIG. 2, the data lines DL1 to DLm are disposed on the gate insulating layer 112 and covered by the protective layer 113.

The pixel electrode PE and a notch electrode NE are disposed on the second insulating layer 114 to be spaced apart from each other. The pixel electrode PE is connected to the drain electrode DE through a first contact hole CH1 formed through the protective layer 113 and the second insulating layer 114. The pixel electrode PE and the notch electrode NE may include indium tin oxide (ITO) or indium zinc oxide (IZO). A reflective electrode RE may be further disposed on the pixel electrode PE and the notch electrode NE to reflect light incident thereupon. When the display apparatus 100 includes the reflective electrode RE, the display apparatus 100 may serve as a reflective-type display apparatus.

A hydrophobic insulating layer 115 is disposed on the reflective electrode RE. The hydrophobic insulating layer 115 includes a material having a hydrophobic property or a surface modified to have the hydrophobic property. The hydrophobic insulating layer 115 may be formed of Teflon that has the hydrophobic property when no electricity is applied thereto and has a hydrophilic property when electricity is applied thereto.

Referring to FIG. 2, an electrode protective layer 117 may be further disposed between the reflective electrode RE and the hydrophobic insulating layer 115. The electrode protective layer 117 may include an insulating material, e.g., silicon oxide, to protect the pixel electrode PE and the reflective electrode RE.

A color filter CF is disposed on the second base substrate 119. The color filter CF includes a color pixel to represent a red, green, or blue color. The color filter CF may further include pixels to represent other colors such as cyan, magenta, yellow or white.

The common electrode CE is disposed on the color filter CF. The common electrode CE faces the pixel electrode PE and receives the first reference voltage.

First and second fluids FL1 and FL2 are disposed between the first base substrate 111 and the second base substrate 119. The first fluid FL1 has the hydrophobic property and may be oil. In addition, the first fluid FL1 includes a black dye or a light absorbing material to absorb light incident thereupon. The second fluid FL2 includes an electrolyte solution having conductivity or polarity. The first and second fluids FL1 and FL2 have different specific gravities from each other, and thus the first and second fluids FL1 and FL2 are not mixed with each other, but are separated from each other with a boundary therebetween.

As an example, when the first fluid FL1 includes dyes or materials representing the red, green, or blue color, the color filter CF may be removed from the display apparatus 100.

The display panel 110 further includes a barrier wall 116 allowing the first and second fluids FL1 and FL2 to be positioned in each pixel PX, thereby preventing the first and second fluids FL1 and FL2 from moving to an adjacent pixel PX. As shown in FIG. 2, the barrier wall 116 may be disposed along the gate lines GL1 to GLn and the data lines DL1 to DLm. The barrier wall 116 may have a hydrophilic property.

FIG. 2 shows the structure of the display apparatus 100 when the display apparatus 100 is used as the reflective-type display apparatus. Accordingly, in the case that the display apparatus 100 is used as the transmissive-type display apparatus, the display apparatus 100 does not include the reflective electrode RE, and thus the area of the storage electrode STE in the display apparatus 100 may be decreased to transmit light from the backlight unit (not shown).

The first reference voltage applied to the common electrode CE is about 15 volts and the voltage applied to the pixel electrode PE is in a range from about −15 volts to about 15 volts. Hereinafter, a voltage, e.g., −15 volts, having the opposite polarity to and the same level as the first reference voltage will be referred to as a second reference voltage. The display apparatus 100 controls the movement of the first and second fluids FL1 and FL2 according to a voltage difference between the pixel electrode PE and the common electrode CE, to thereby display gray scales.

Figure 3:
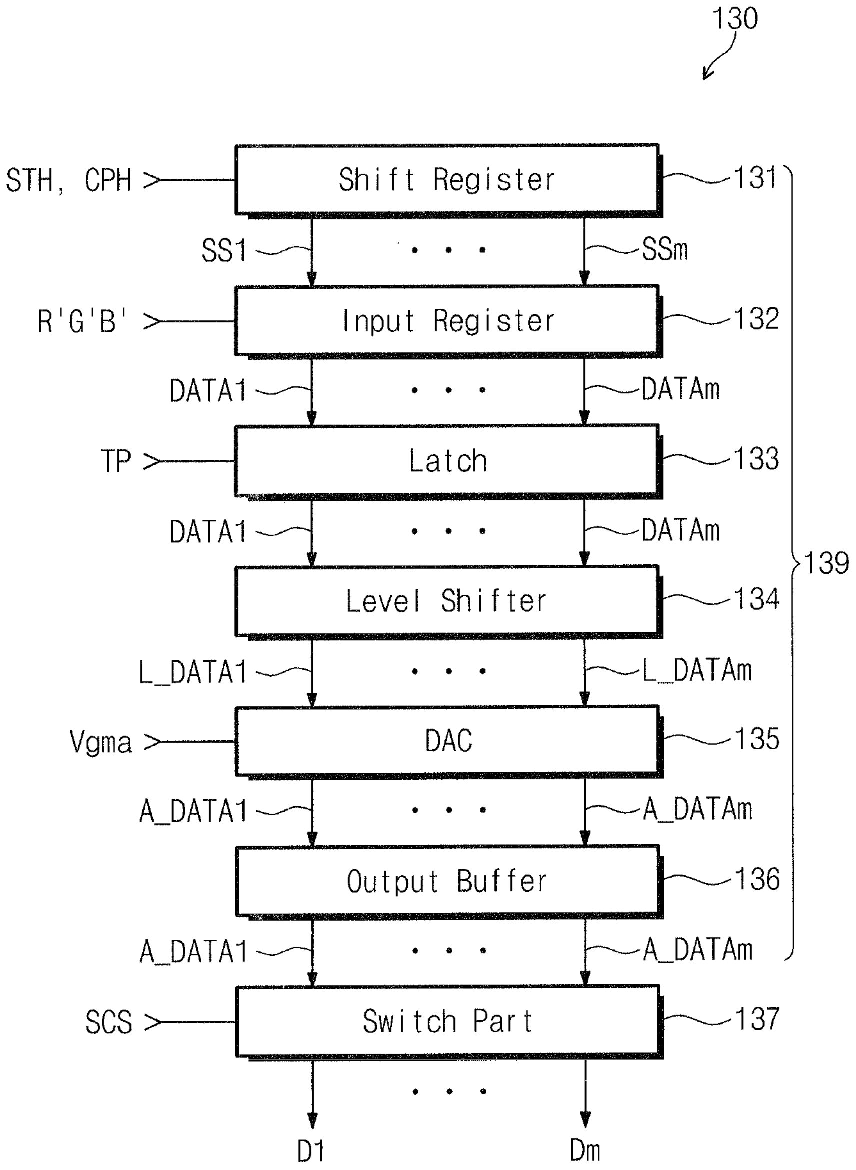
FIG. 3 is a block diagram showing a data driver shown in FIG. 1, according to an exemplary embodiment of the present invention.

FIG. 3 is a block diagram showing the data driver 130 shown in FIG. 1, according to an exemplary embodiment of the present invention.

Referring to FIG. 3, the data driver 130 includes a data processing part 139 and a switch part 137.

The data processing part 139 receives the image signals R'G'B' and the data control signals DCS to output the data voltages D1 to Dm to the data lines DL1 to DLm.

The data processing part 139 includes a shift register 131, an input register 132, a latch 133, a level shifter 134, a digital-to-analog converter (hereinafter, referred to as DAC) 135, and an output buffer 136.

The shift register 131 receives the data start signal STH and the data synchronization signal CPH of the data control signals DCS to output a plurality of sampling signals SS1 to SSm. In detail, the shift register 131 shifts the data start signal STH every one period of the data synchronization signal CPH to generate the m sampling signals SS1 to SSm. To this end, the shift register 131 includes m shift registers.

The input register 132 sequentially stores the image signals R'G'B' in response to the sampling signals SS1 to SSm sequentially provided from the shift register 131. In detail, the input register 132 stores the image signals R'G'B' corresponding to one line of the display panel 110 as data DATA1 to DATAm in response to the sampling signals SS1 to SSm. To this end, the input register 132 includes m data input latches to latch the m data DATA1 to DATAm.

The latch 133 receives the data DATA1 to DATAm from the input register 132 and outputs the latched data DATA1 to DATAm. In other words, when the load signal TP of the data control signals DCS is applied to the latch 133, the latch 133 receives the data DATA1 to DATAm stored in the input register 132 and stores the data DATA1 to DATAm therein. The latch 133 includes the same number of data storing latches as the data input latches of the input register 132.

The level shifter 134 expands a voltage range of the latched data DATA1 to DATAm output from the latch 133 to correspond to the DAC 135 and outputs the level-shifted data as L_DATA1 to L_DATAm.

The DAC 135 outputs analog data voltages A_DATA1 to A_DATAm respectively corresponding to the level-shifted data L_DATA1 to L_DATAm using a gamma reference voltage Vgma provided from an external device (not shown). The analog data voltages A_DATA1 to A_DATAm are to be applied to the pixels PX to display specific gray scale levels.

The output buffer 136 includes buffers to apply the analog data voltages A_DATA1 to A_DATAm from the DAC 135 to the switch part 137.

The switch part 137 applies the analog data voltages A_DATA1 to A_DATAm, the first reference voltage, or intermediate voltages to the data lines DL1 to DLm in response to the switch control signal SCS of the data control signals DCS.

Figure 4:
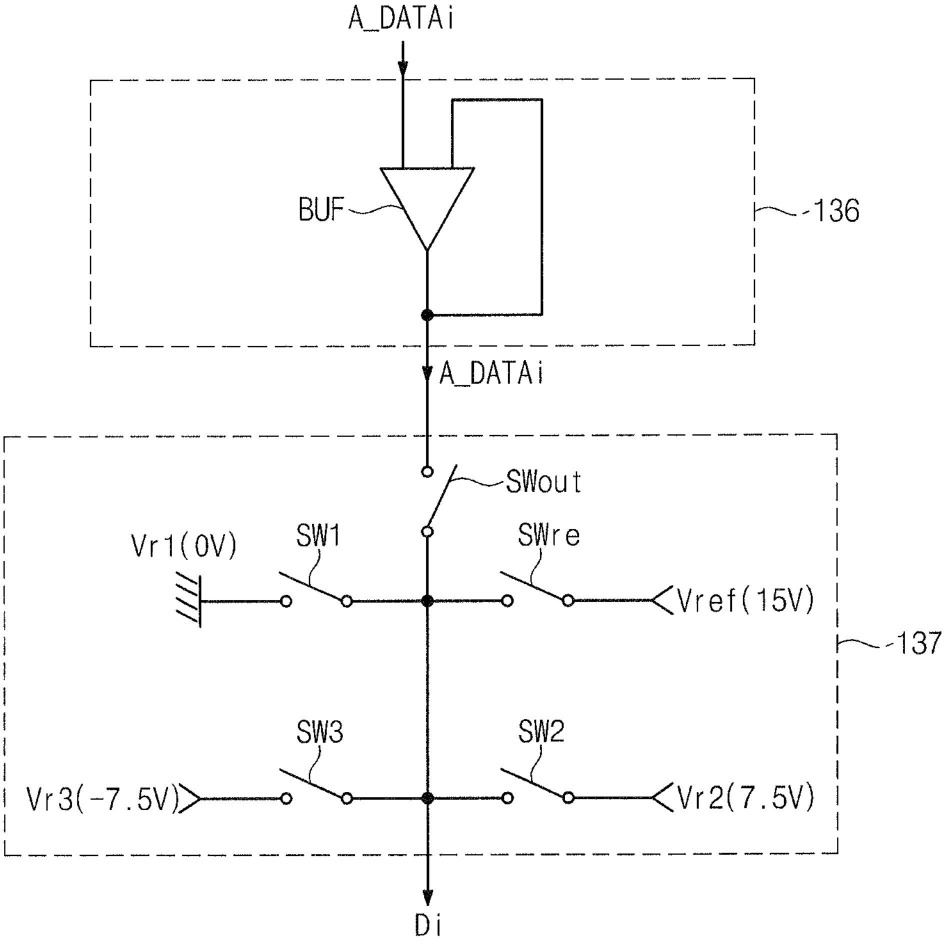
FIG. 4 is a circuit diagram showing an output buffer and a switch part shown in FIG. 3, according to an exemplary embodiment of the present invention.

FIG. 4 is a circuit diagram showing the output buffer 136 and the switch part 137 shown in FIG. 3, according to an exemplary embodiment of the present invention. In detail, FIG. 4 shows a buffer and switches corresponding to one data line DLi.

Referring to FIG. 4, the output buffer 136 includes a buffer BUF. The buffer BUF receives the analog data voltage A_DATAi from the DAC 135 to increase the level of the current of the analog data voltage A_DATAi while maintaining the level of the voltage of the analog data voltage A_DATAi.

The switch part 137 includes an output switch SWout to control whether the analog data voltage A_DATAi output from the buffer BUF is applied to the data line DLi and a reset switch SWre to control whether the first reference voltage Vref is applied to the data line DLi. In FIG. 4, the first reference voltage Vref is about 15 volts.

The switch part 137 may further include at least one of a first switch SW1, a second switch SW2, or a third switch SW3. Although pole-type switches are shown in the switch part 137 in FIG. 4, other types of switching devices such as thin film transistors may be employed by the switch part 137.

The first switch SW1 is connected to a terminal to which a first intermediate voltage Vr1 is applied to control whether the first intermediate voltage Vr1, e.g., the ground voltage of about 0 volts, is applied to the data line DLi. The second switch SW2 receives a second intermediate voltage Vr2 having a voltage level between the first reference voltage Vref and the first intermediate voltage Vr1 to control whether the second intermediate voltage Vr2 is applied to the data line DLi. The third switch SW3 receives a third intermediate voltage Vr3 having a voltage level between the first intermediate voltage Vr1 and the second reference voltage, e.g., −15 volts, to control whether the third intermediate voltage Vr3 is applied to the data line DLi. In FIG. 4, the second intermediate voltage Vr2 is about 7.5 volts and the third intermediate voltage Vr3 is about −7.5 volts.

Figure 5:
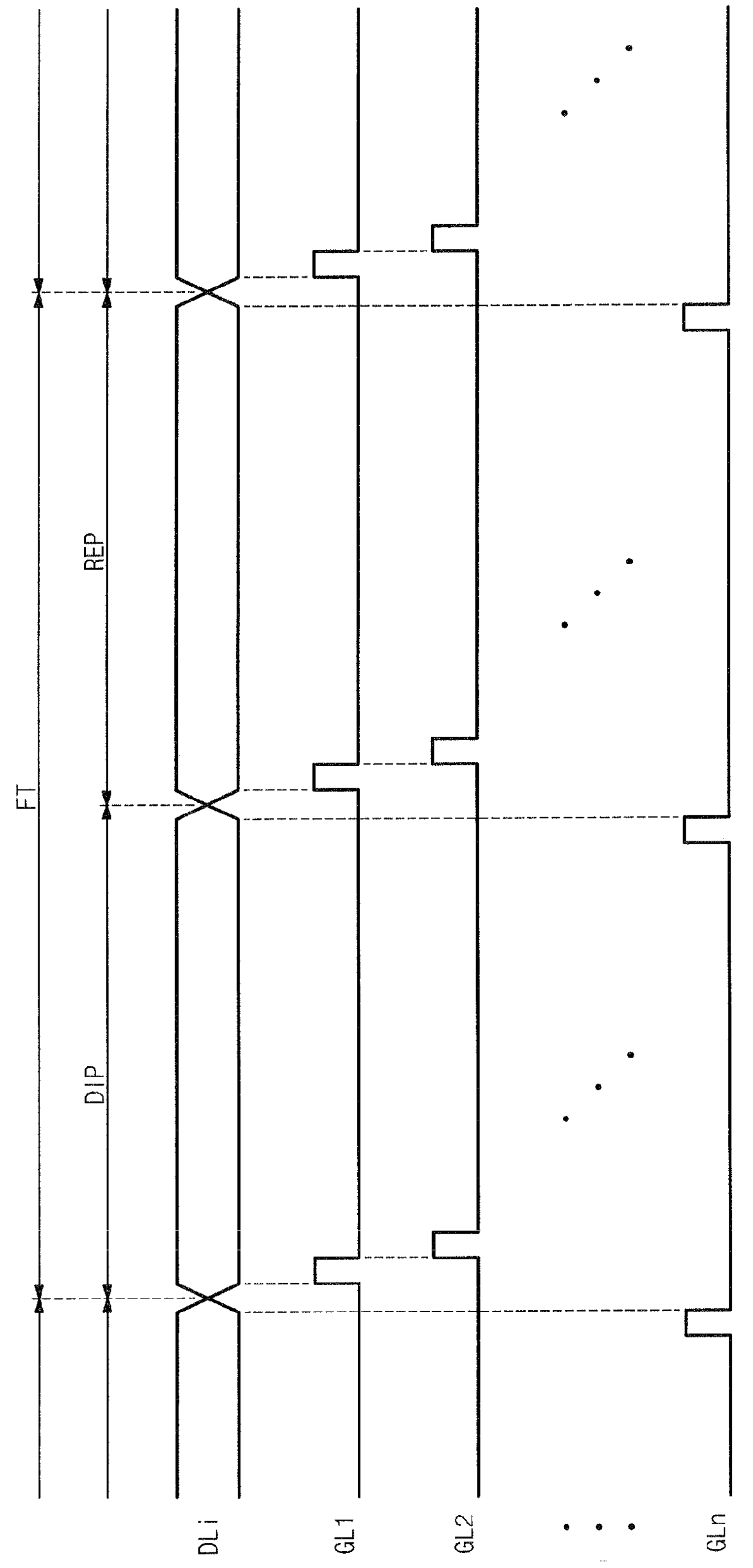
FIG. 5 is a timing diagram showing a signal applied to a data line during one frame, according to an exemplary embodiment of the present invention.

FIG. 5 is a timing diagram showing a signal applied to the data line DLi described with reference to FIG. 4 during one frame, according to an exemplary embodiment of the present invention.

Referring to FIG. 5, the one frame period FT is divided into a data input time period DIP and a reset time period REP according to signals output to the data line DLi in the one frame period FT.

A data signal Di, shown in FIG. 4, is output to each pixel PX from the data line DLi during the data input time period DIP as the gate lines GL1 to GLn are sequentially turned on. Thus, each pixel PX may display a corresponding gray scale in response to the data signal Di. The first reference voltage Vref is applied to the data line DLi during the reset time period REP following the data input time period DIP and the gate lines GL1 to GLn are sequentially turned on again. Accordingly, each pixel PX is charged with the first reference voltage Vref.

In other words, each pixel PX displays a predetermined image in response to the data signal Di applied during the data input time period DIP until the first reference voltage Vref is applied during the reset time period REP. When the first reference voltage Vref is input during the reset time period REP, each pixel PX displays a basic gray scale color, e.g., a white gray scale or a black gray scale. The application of the first reference voltage Vref to each pixel PX is to initialize each pixel PX before the data signal Di is input during a next frame period. Referring to FIG. 4, the reset switch SWre is maintained in a turned-on state during the reset time period REP, and thus the first reference voltage Vref is applied to each pixel PX.

According to an exemplary embodiment of the present invention, the length and the position of the data input time period DIP and the reset time period REP in the one frame time period FT may be varied.

Figure 6:
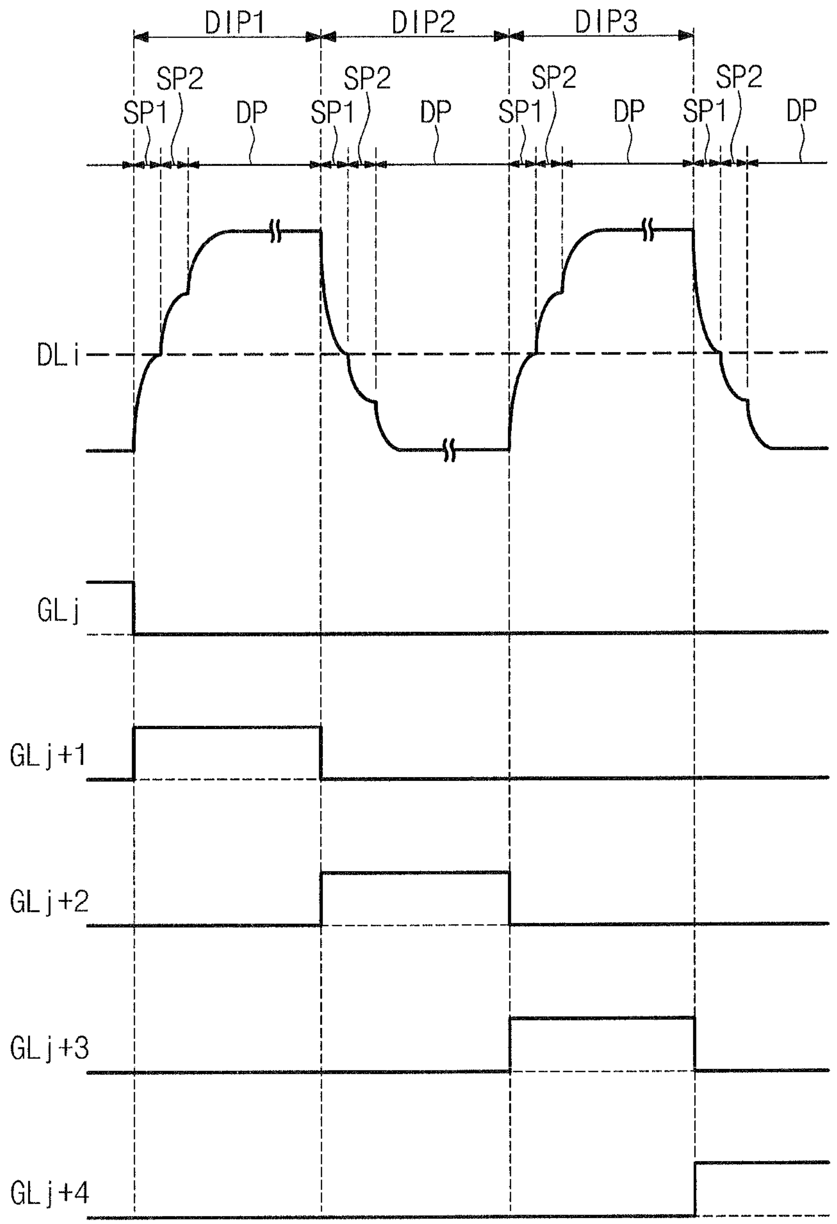
FIG. 6 is a timing diagram showing a voltage applied to data line during a data input time period shown in FIG. 5, according to an exemplary embodiment of the present invention.

FIG. 6 is a timing diagram showing a voltage applied to the data line DLi during a data input time period DIP shown in FIG. 5, according to an exemplary embodiment of the present invention.

Referring to FIG. 6, the voltage output from the data line DLi during a first data input time period DIP1, a second data input time period DIP2, and a third data input time period DIP3 is sequentially applied to a first pixel PX1, a second pixel PX2, and a third pixel PX3 sequentially connected to the data line DLi. In the present exemplary embodiment, the first to third data input time periods DIP1 to DIP3 correspond to a portion of the data input time period DIP shown in FIG. 5.

The first pixel PX1 is connected to a second gate line GLj+1 of first to fifth gate lines GLj to GLj+4 sequentially arranged and the data line DLi, the second pixel PX2 is connected to the third gate line GLj+2 and the data line DLi, and the third pixel PX3 is connected to the fourth gate line GLj+3 and the data line DLi.

In detail, the voltage output from the data line DLi during the first data input time period DIP1 is applied to the first pixel PX1 during a high period of a gate signal applied to the second gate line GLj+1, the voltage output from the data line DLi during the second data input time period DIP2 is applied to the second pixel PX2 during a high period of a gate signal applied to the third gate line GLj+2, and the voltage output from the data line DLi during the third data input time period DIP3 is applied to the third pixel PX3 during a high period of a gate signal applied to the fourth gate line GLj+3.

The first, second, and third data input time periods DIP1, DIP2, and DIP3 each have a first switch time period SP1, a second switch time period SP2, and a data time period DP.

Referring to FIGS. 4 and 6, either the first, second, or third switch SW1, SW2, or SW3 is turned on during each of the first and second switch time periods SP1 and SP2, and thus one of the first to third intermediate voltages Vr1 to Vr3 may be output to the data line DLi.

The data time period DP means a time period during which the output switch SWout is turned on and the analog data voltage A_DATAi output from the buffer BUF is applied to the data line DLi.

Hereinafter, the operation of the switch part 137 will be described in detail with reference to Table 1 and FIGS. 4 and 6.

Table 1 shows a range of a data voltage level applied to a present pixel PXp, a range of a data voltage level applied to a next pixel PXn, and the operation of the switch part 137 when the data voltage is applied to the next pixel PXn.

In Table 1, two pixels PX sequentially connected to the data line DLi are referred to as the present pixel PXp and the next pixel PXn.

When the voltage difference between the voltage applied to the present pixel PXp and the voltage applied to the next pixel PXn is large, the voltage level may be sequentially changed using the first to third switches SW1 to SW3. In the case that the voltage level is changed using only the voltage output to the buffer BUF when the difference between the voltage applied to the present pixel PXp and the voltage applied to the next pixel PXn is large, the buffer BUF may be overloaded due to excess heat generated by the buffer BUF. However, when the level of the voltage applied to the next pixel PXn incrementally reaches its full voltage level rather than suddenly, by using the first to third switches SW1 to SW3, the load on the buffer BUF and the heat generated by the buffer BUF may be reduced.

In the case that one of the first, second, and third intermediate voltages Vr1, Vr2, and Vr3 is in the range between the level of the data voltage applied to the present pixel PXp and the level of the data voltage applied to the next pixel PXn, the switch part 137 may apply at least one of the first, second, and third intermediate voltages Vr1, Vr2, and Vr3 to the next pixel PXn using the first to third switches SW1 to SW3.

When at least two voltages of the first, second, and third intermediate voltages Vr1, Vr2, and Vr3 are applied, the two voltages of the first, second, and third intermediate voltages Vr1, Vr2, and Vr3 may be applied in the order of their voltage levels, e.g., from high to low, or low to high.

As an example, when a voltage of about 3.75 volts to about −3.75 volts is applied to the next pixel PXn after a voltage of about 15 volts to about 11.25 volts is applied to the present pixel PXp, the second switch SW2 is turned on during the first and second switch time periods SP1 and SP2 to apply a voltage of about 7.5 volts to the next pixel PXn before the output switch SWout is turned on, and then the output switch SWout is turned on during the data time period DP to charge the next pixel PXn with the analog data voltage A_DATAi.

As another example, when a voltage of about 15 volts to about 11.25 volts is applied to the next pixel PXn after a voltage of about −11.25 volts to about −15 volts is applied to the present pixel PXp, the first switch SW1 is turned on during the first switch time period SP1 to apply a voltage of about 0 volts to the next pixel PXn before the output switch SWout is turned on and the second switch SW2 is turned on during the second switch time period SP2 to apply a voltage of about 7.5 volts to the next pixel PXn before the output switch SWout is turned on. Then, the output switch SWout is turned on to charge the analog data voltage A_DATAi to the next pixel PXn.

TABLE 1

| Present pixel PXp | Next pixel PXn | Switch part 137 | | |
|---|---|---|---|---|
| (volts) | (volts) | SP1 | SP2 | DP |
| 15~11.25 | 15~11.25 | SWout | SWout | SWout |
| | 11.25~3.75 | SW2 | SW2 | SWout |
| | 3.75~−3.75 | SW2 | SW2 | SWout |
| | −3.75~−11.25 | SW1 | SW3 | SWout |
| | −11.25~−15 | SW1 | SW3 | SWout |
| 11.25~3.75 | 15~11.25 | SWout | SWout | SWout |
| | 11.25~3.75 | SWout | SWout | SWout |
| | 3.75~−3.75 | SW1 | SW1 | SWout |
| | −3.75~−11.25 | SW1 | SW3 | SWout |
| | −11.25~−15 | SW1 | SW3 | SWout |
| 3.75~−3.75 | 15~11.25 | SW2 | SW2 | SWout |
| | 11.25~3.75 | SW2 | SW2 | SWout |
| | 3.75~−3.75 | SWout | SWout | SWout |
| | −3.75~−11.25 | SW3 | SW3 | SWout |
| | −11.25~−15 | SW3 | SW3 | SWout |
| −3.75~−11.25 | 15~11.25 | SW1 | SW2 | SWout |
| | 11.25~3.75 | SW1 | SW2 | SWout |
| | 3.75~−3.75 | SW1 | SW1 | SWout |
| | −3.75~−11.25 | SWout | SWout | SWout |
| | −11.25~−15 | SW3 | SW3 | SWout |
| −11.25~−15 | 15~11.25 | SW1 | SW2 | SWout |
| | 11.25~3.75 | SW1 | SW2 | SWout |
| | 3.75~−3.75 | SW1 | SW1 | SWout |
| | −3.75~−11.25 | SW3 | SW3 | SWout |
| | −11.25~−15 | SWout | SWout | SWout |

To carry out the above-mentioned operation of the switch part 137, the timing controller 140 analyzes the image signals RGB to generate the image signals R'G'B' applied to the data lines DL1 to DLm and the switch control signals SCS for the image signals R'G'B'.

In FIG. 4, the first to third switches SW1 to SW3 have been shown as an example, but the switch part 137 may be configured to have at least one of the first to third switches SW1 to SW3 according to an exemplary embodiment of the present invention. Similarly, the voltage range and the operation of the switch part 137 shown in Table 1 may be changed according to the voltage level and the number of the switches required by the display panel 110.

As shown in FIG. 6, each of the first to third data input time periods DIP1 to DIP3 includes the first and second switch time periods SP1 and SP2, but it should not be limited thereto or thereby. In other words, the first to third data input time periods DIP1 to DIP3 may include at least one switch time period SP. Further, the length of the first and second switch time periods SP1 and SP2 may be varied depending on the difference between a voltage applied to the present pixel PXp and a voltage applied to the next pixel PXn.

Figure 7:
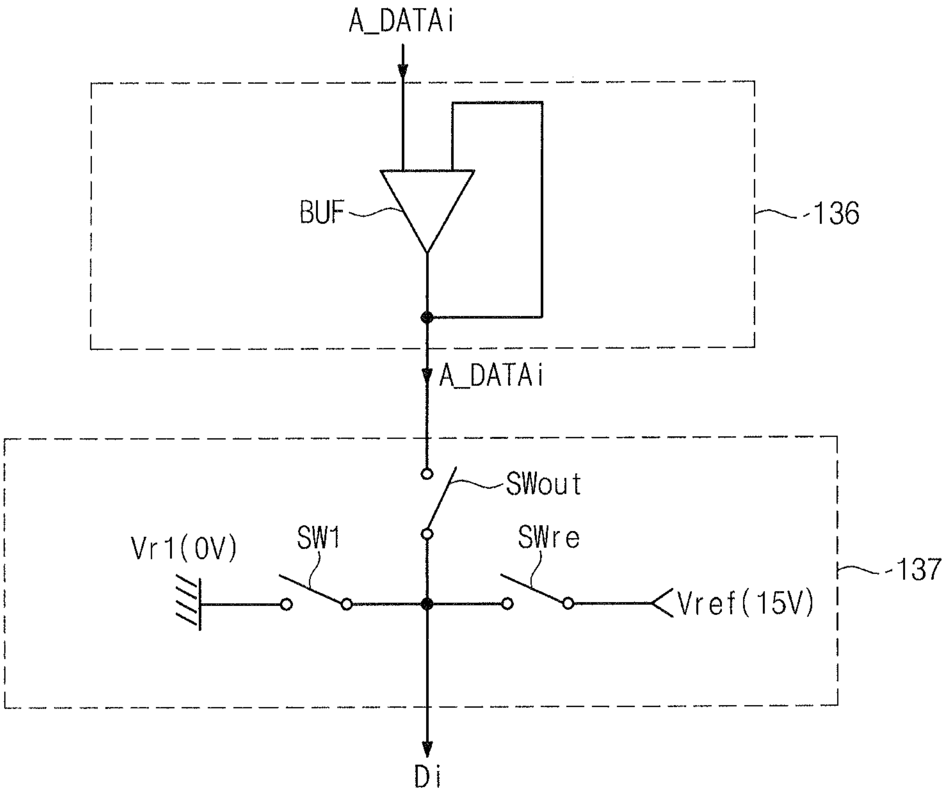
FIG. 7 is a circuit diagram showing an output buffer and a switch part shown in FIG. 3 according to an exemplary embodiment of the present invention.

FIG. 7 is a circuit diagram showing the output buffer 136 and the switch part 137 shown in FIG. 3 according to an exemplary embodiment of the present invention. In detail, FIG. 7 shows a buffer and switches corresponding to one data line DLi.

Referring to FIG. 7, the output buffer 136 includes a buffer BUF. The buffer BUF receives the analog data voltage A_DATAi from the DAC 135 to increase the level of the current of the analog data voltage A_DATAi while maintaining the level of the voltage of the analog data voltage A_DATAi.

The switch part 137 includes an output switch SWout to control whether the analog data voltage A_DATAi output from the buffer BUF is applied to the data line DLi and a reset switch SWre to control whether the first reference voltage Vref is applied to the data line DLi. In FIG. 7, the first reference voltage Vref is about 15 volts.

The switch part 137 may further include a first switch SW1. The first switch SW1 is connected to the first intermediate voltage Vr1, e.g., the ground voltage of about 0 volts, to control whether the first intermediate voltage Vr1 is applied to the data line DLi.

Figure 8:
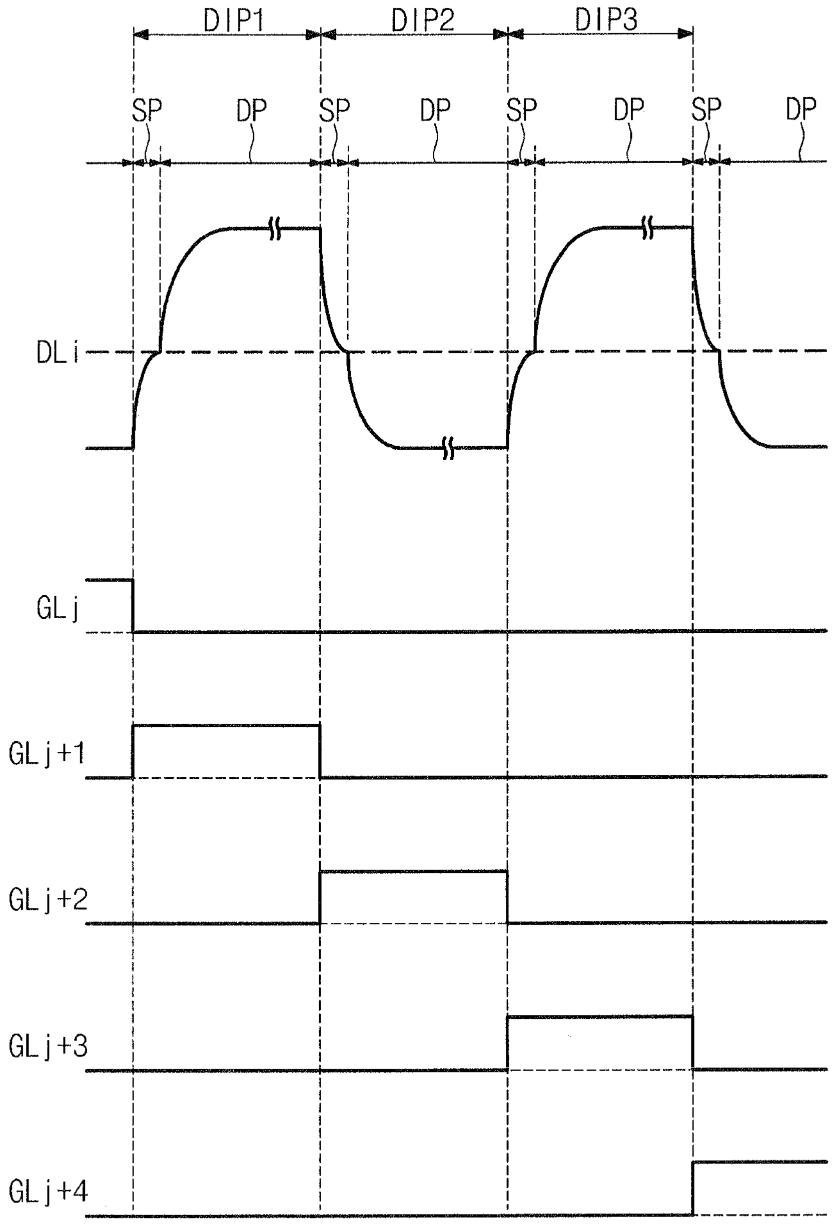
FIG. 8 is a timing diagram showing a voltage applied to a data line during a data input time period, according to an exemplary embodiment of the present invention.

FIG. 8 is a timing diagram showing a voltage applied to the data line DLi during a data input time period, according to an exemplary embodiment of the present invention.

Referring to FIG. 8, the voltage output from the data line DLi during the first data input time period DIP1, the second data input time period DIP2, and the third data input time period DIP3 is sequentially applied to the first pixel PX1, the second pixel PX2, and the third pixel PX3 sequentially connected to the data line DLi. In the present exemplary embodiment, the first to third data input time periods DIP1 to DIP3 correspond to the portion of the data input time period DIP shown in FIG. 5.

The first pixel PX1 is connected to the second gate line GLj+1 of the first to fifth gate lines GLj to GLj+4 sequentially arranged and the data line DLi, the second pixel PX2 is connected to the third gate line GLj+2 and the data line DLi, and the third pixel PX3 is connected to the fourth gate line GLj+3 and the data line DLi.

In detail, the voltage output from the data line DLi during the first data input time period DIP1 is applied to the first pixel PX1 during the high period of the gate signal applied to the second gate line GLj+1, the voltage output from the data line DLi during the second data input time period DIP2 is applied to the second pixel PX2 during the high period of the gate signal applied to the third gate line GLj+2, and the voltage output from the data line DLi during the third data input time period DIP3 is applied to the third pixel PX3 during the high period of the gate signal applied to the fourth gate line GLj+3.

Each of the first, second, and third data input time periods DIP1, DIP2, and DIP3 is divided into the switch time period SP and the data time period DP.

Referring to FIGS. 7 and 8, the switch time period SP indicates a time period in which the first intermediate voltage Vr1 is applied to the data line DLi after the first switch SW1 is turned on.

The data time period DP indicates a time period during which the analog data voltage A_DATAi output from the buffer BUF is applied to the data line DLi after the output switch SWout is turned on.

As mentioned above, two pixels PX sequentially connected to the data line DLi are referred to as the present pixel PXp and the next pixel PXn. Now, in the case that a voltage having a voltage level between the first reference voltage Vref and the first intermediate voltage Vr1 is applied to the present pixel PXp and a voltage having a voltage level between the first reference voltage Vref and the first intermediate voltage Vr1 is applied to the next pixel PXn, the analog data voltage A_DATAi is applied to the next pixel PXn in the switch time period SP and the data time period DP, without first applying the first intermediate voltage Vr1 to the next pixel PXn in the switch time period SP.

However, when a voltage having a voltage level between the second reference voltage and the first intermediate voltage Vr1 is applied to the present pixel PXp and a voltage having a voltage level between the first reference voltage Vref and the first intermediate voltage Vr1 is applied to the next pixel PXn, the analog data voltage A_DATAi is applied to the next pixel PXn during the data time period DP after the first intermediate voltage Vr1 is applied to the next pixel PXn during the switch time period SP.

Thus, when the level of the voltage applied to the next pixel PXn incrementally reaches its full level rather than suddenly, by using the first switch SW1, the load on the buffer BUF and the heat generated by the buffer BUF may be reduced.

Figure 9:
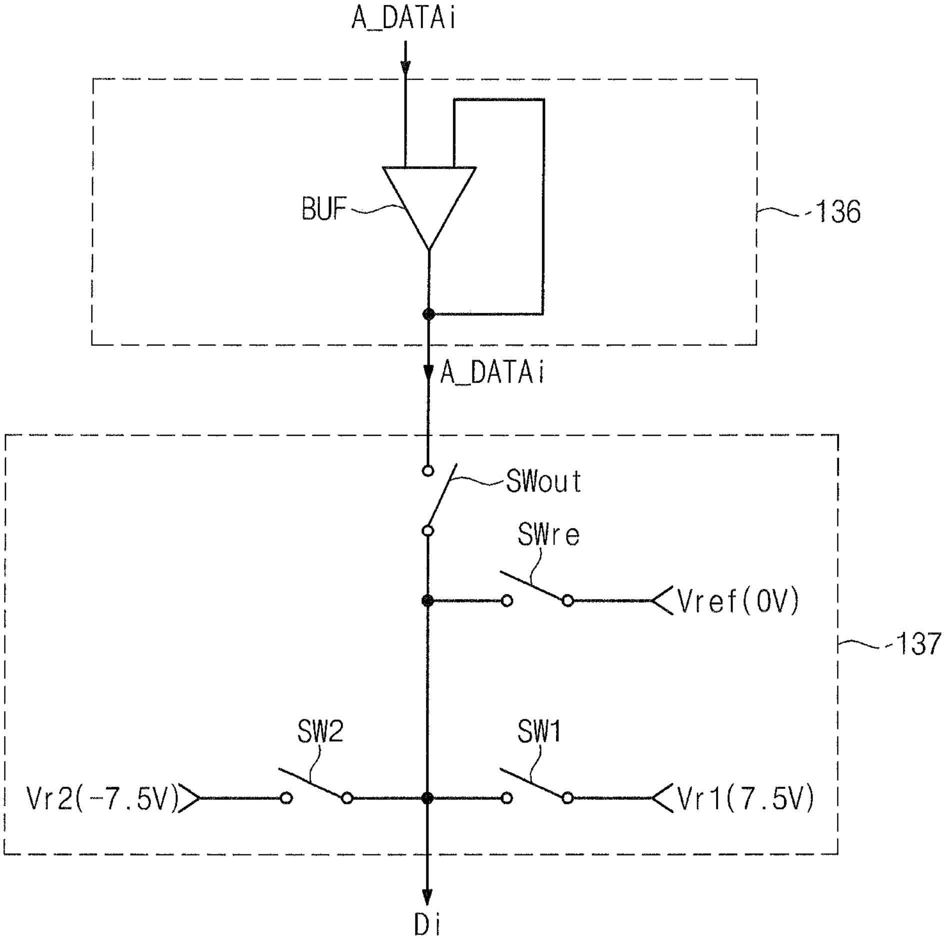
FIG. 9 is a circuit diagram showing an output buffer and a switch part shown in FIG. 3 according to an exemplary embodiment of the present invention.

FIG. 9 is a circuit diagram showing the output buffer 136 and the switch part 137 shown in FIG. 3 according to an exemplary embodiment of the present invention. In detail, FIG. 9 shows a buffer and switches corresponding to one data line DLi.

Referring to FIG. 9, the output buffer 136 includes a buffer BUF. The buffer BUF receives the analog data voltage A_DATAi from the DAC 135 to increase the level of the current of the analog data voltage A_DATAi while maintaining the level of the voltage of the analog data voltage A_DATAi.

The switch part 137 includes an output switch SWout to control whether the analog data voltage A_DATAi output from the buffer BUF is applied to the data line DLi and a reset switch SWre to control whether the first reference voltage Vref is applied to the data line DLi.

In FIG. 9, the first reference voltage Vref is about 0 volts. The first reference voltage Vref is applied to the common electrode CE. Accordingly, when the analog data voltage A_DATAi applied to the pixel electrode PE has a voltage level in a range from about −15 volts to about +15 volts, the display apparatus 100 may be operated in an inversion mode.

The switch part 137 further includes a first switch SW1 and a second switch SW2. The first switch SW1 is connected to a terminal to which the first intermediate voltage Vr1, e.g., +7.5 volts, is applied to control whether the first intermediate voltage Vr1 is applied to the data line DLi. The second switch SW2 is connected to a terminal to which the second intermediate voltage Vr2, e.g., −7.5 volts, is applied to control whether the second intermediate voltage Vr2 is applied to the data line DLi.

Hereinafter, the operation of the switch part 137 will be described in detail with reference to FIG. 10.

Figure 10:
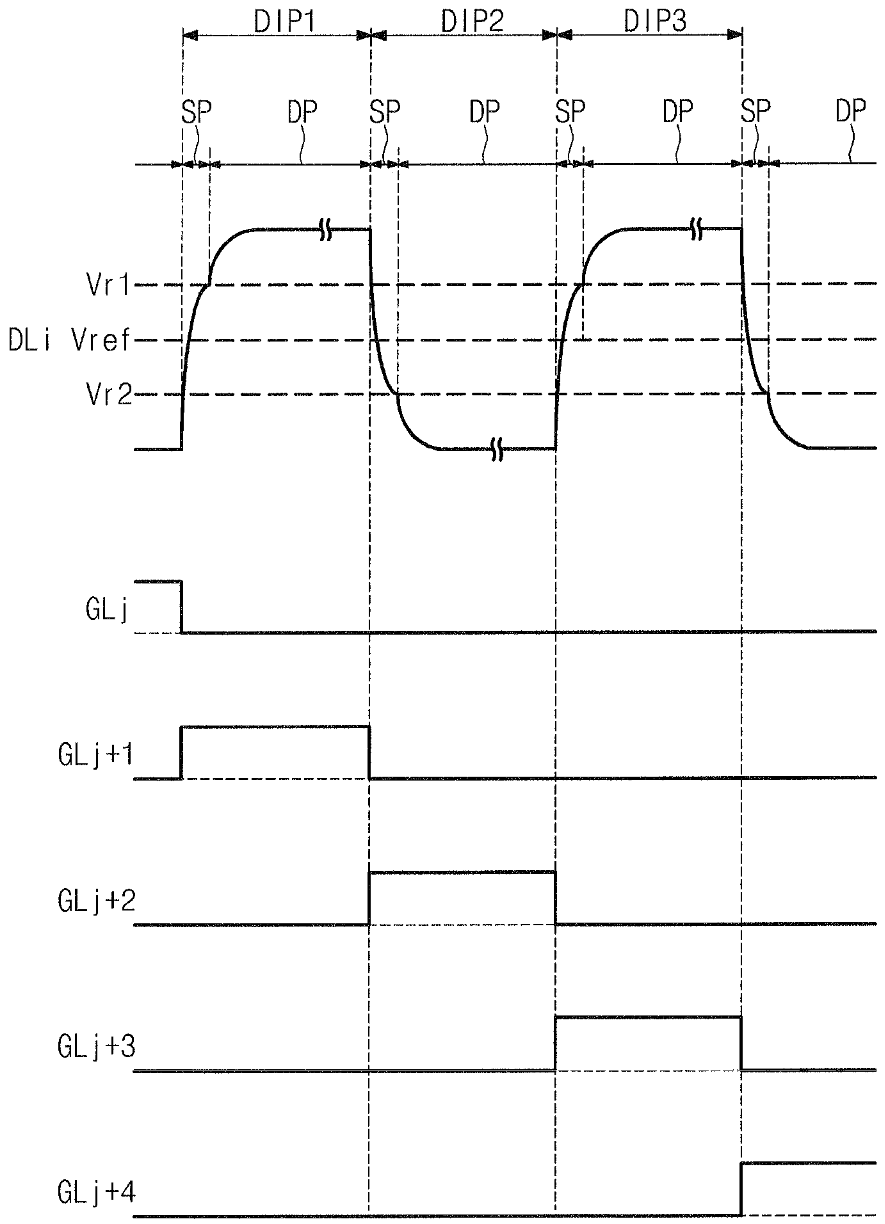
FIG. 10 is a timing diagram showing a voltage applied to a data line during a data input time period, according to an exemplary embodiment of the present invention.

FIG. 10 is a timing diagram showing a voltage applied to the data line DLi during a data input time period, according to an exemplary embodiment of the present invention.

Referring to FIG. 10, the voltage output from the data line DLi during the first data input time period DIP1, the second data input time period DIP2, and the third data input time period DIP3 is sequentially applied to the first pixel PX1, the second pixel PX2, and the third pixel PX3 sequentially connected to the data line DLi. In the present exemplary embodiment, the first to third data input time periods DIP1 to DIP3 correspond to the portion of the data input time period DIP shown in FIG. 5.

The first pixel PX1 is connected to the second gate line GLj+1 of the first to fifth gate lines GLj to GLj+4 sequentially arranged and the data line DLi, the second pixel PX2 is connected to the third gate line GLj+2 and the data line DLi, and the third pixel PX3 is connected to the fourth gate line GLj+3 and the data line DLi.

In detail, the voltage output from the data line DLi during the first data input time period DIP1 is applied to the first pixel PX1 during the high period of the gate signal applied to the second gate line GLj+1, the voltage output from the data line DLi during the second data input time period DIP2 is applied to the second pixel PX2 during the high period of the gate signal applied to the third gate line GLj+2, and the voltage output from the data line DLi during the third data input time period DIP3 is applied to the third pixel PX3 during the high period of the gate signal applied to the fourth gate line GLj+3.

Each of the first, second, and third data input time periods DIP1, DIP2, and DIP3 is divided into the switch time period SP and the data time period DP.

Referring to FIGS. 9 and 10, the switch time period SP indicates a time period in which the first intermediate voltage Vr1 or the second intermediate voltage Vr2 is applied to the data line DLi after the first switch SW1 or the second switch SW2 is turned on.

The data time period DP indicates a time period during which the analog data voltage A_DATAi output from the buffer BUF is applied to the data line DLi after the output switch SWout is turned on.

As mentioned above, two pixels PX sequentially connected to the data line DLi are referred to as the present pixel PXp and the next pixel PXn. Now, in the case that a voltage having a voltage level between about −15 volts and about 0 volts is applied to the present pixel PXp and a voltage having a voltage level between about −15 volts and about 0 volts is applied to the next pixel PXn, the analog data voltage A_DATAi is applied to the next pixel PXn in the switch time period SP and the data time period DP, without first applying the first intermediate voltage Vr1 or the second intermediate voltage Vr2 to the next pixel PXn in the switch time period SP.

However, when a voltage having a voltage level between about −15 volts and about 0 volts is applied to the present pixel PXp and a voltage having a voltage level between about 0 volts and about +15 volts is applied to the next pixel PXn, the analog data voltage A_DATAi is applied to the next pixel PXn during the data time period DP after the first intermediate voltage Vr1 is applied to the next pixel PXn during the switch time period SP.

In addition, when a voltage having a voltage level between about 0 volts and about +15 volts is applied to the present pixel PXp and a voltage having a voltage level between about −15 volts and about 0 volts is applied to the next pixel PXn, the analog data voltage A_DATAi is applied to the next pixel PXn during the data time period DP after the second intermediate voltage Vr2 is applied to the next pixel PXn during the switch time period SP.

Thus, when the level of the voltage applied to the next pixel PXn is incrementally reaches its full level rather than suddenly, by using the first switch SW1 or the second switch SW2, the load on the buffer BUF and the heat generated by the buffer BUF may be reduced.

Figure 11:
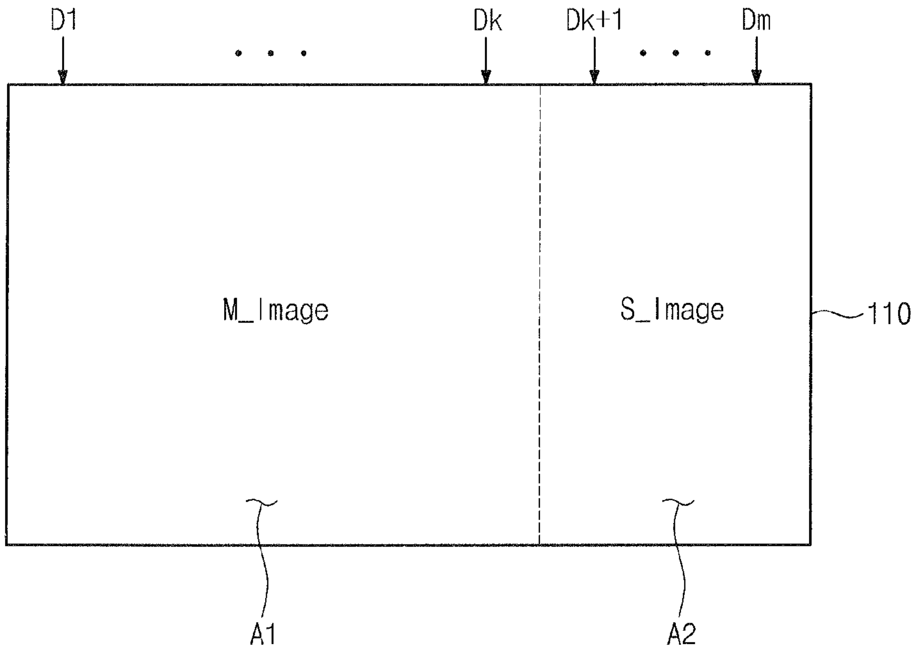
FIG. 11 is a view showing a method of driving the display apparatus shown in FIG. 1, according to an exemplary embodiment of the present invention.

FIG. 11 is a view showing a method of driving the display apparatus shown in FIG. 1, according to an exemplary embodiment of the present invention.

Referring to FIG. 11, the display panel 110 may about simultaneously display a moving image M-Image and a still image S_Image. In detail, when a display surface of the display panel 110 is divided into a first area A1 and a second area A2, the display panel 110 displays the moving image M_Image in the first area A1 and the still image S_Image in the second area A2.

In the case that the display panel 110 displays the moving image M_Image, the display panel 110 is driven at a frequency of 60 Hz or more to allow a user to perceive motion in successive images. However, in the case that the display panel 110 displays the still image S_Image, the display panel 110 may be driven at a frequency lower than 60 Hz, e.g., 30 Hz or 10 Hz. This enables to displayed images to appear motionless.

Referring to FIGS. 4 and 11, the output frequency of the first to k-th data signals D1 to Dk may be different from the output frequency of the (k+1)th to m-th data signals Dk+1 to Dm by controlling an ON-OFF timing of the output switch SWout shown in FIG. 4 according to the type of image to be displayed on the display panel 110 shown in FIG. 11.

In detail, when the moving image M_Image is displayed in the first area A1 to which the first to k-th data signals D1 to Dk are applied and the still image S_Image is displayed in the second area A2 to which the (k+1)th to m-th data signals Dk+1 to Dm are applied, the first to k-th data signals D1 to Dk may be output at a frequency of 60 Hz or more and the (k+1)th to m-th data signals Dk+1 to Dm may be output at a frequency lower than 60 Hz.

As described above, the output frequency of the data signals D1 to Dk and Dk+1 to Dm is controlled according to the type of image to be displayed on the display panel 110, and thus the power consumption of the display apparatus 100 may be reduced.

According to the above described exemplary embodiments, the data driver 130 includes the switch part 137 to selectively apply at least one intermediate voltage (e.g., Vr1, Vr2 or Vr3) before the data driver 130 applies the data voltage (e.g., Di) corresponding to a specific gray scale to the display panel 110, thereby reducing a load on the output buffer 136. In addition, a frequency of the data voltage Di output from the data driver 130 may be changed depending on whether a moving image M_Image or a still image S_Image is to be displayed on the display panel 110, thus power consumption of the display apparatus 100 may be reduced.

Although the exemplary embodiments of the present invention have been described, it is understood that the present invention should not be limited to these exemplary embodiments but various changes and modifications can be made by one of ordinary skill in the art within the spirit and scope of the present invention as hereinafter claimed.

What is claimed is:

1. A display apparatus, comprising:

a display panel including a plurality of gate lines, a plurality of data lines, and a plurality of pixels connected to the gate lines and the data lines to display an image;

a gate driver configured to apply a gate signal to the gate lines; and a data driver configured to apply a data signal to the data lines, wherein:

a first pixel and a second pixel of the pixels are sequentially connected to a corresponding data line, a first intermediate voltage has a voltage level between a first voltage and a second voltage, a second intermediate voltage has a greater voltage level than the first intermediate voltage, a third intermediate voltage has a voltage level less than the first intermediate voltage, a data voltage corresponds to a specific gray scale, at least one of the first, second, or third intermediate voltages is selected based on a data voltage of the first pixel and a data voltage of the second pixel, and the selected intermediate voltage and the data voltage are sequentially applied to the second pixel as the data signal during a frame period.

2. The display apparatus of claim 1, wherein a voltage level of the first intermediate voltage is an average voltage level of the first and second voltages, a voltage level of the second intermediate voltage is an average voltage level of the first voltage and the first intermediate voltage, and a voltage level of the third intermediate voltage is an average voltage level of the second voltage and the first intermediate voltage.

3. The display apparatus of claim 2, wherein the data driver comprises a data processing part and a switch part and the switch part comprises a first switch connected between a terminal that receives the first intermediate voltage and the corresponding data line of the data lines.

4. The display apparatus of claim 3, wherein the switch part further comprises:

a second switch connected between a terminal that receives the second intermediate voltage and the corresponding data line; and a third switch connected between a terminal that receives the third intermediate voltage and the corresponding data line.

5. The display apparatus of claim 4, wherein the switch part selects and applies at least one of the first, second, or third intermediate voltages to the second pixel using the first, second, or third switches when at least one of the first, second, or third intermediate voltages has a voltage level between a voltage level of a data voltage applied to the first pixel and a voltage level of a data voltage to be applied to the second pixel.

6. The display apparatus of claim 4, wherein the switch part comprises:

a reset switch connected to a terminal that receives the first voltage and the corresponding data line; and an output switch connected to the data processing part and the corresponding data line.

7. The display apparatus of claim 5, wherein, when at least two voltages of the first, second, and third intermediate voltages are applied to the second pixel, the at least two voltages are applied in the order of their voltage levels.

8. The display apparatus of claim 3, further comprising a timing controller configured to receive image signals and control signals from an external device and apply a gate control signal to the gate driver and a data control signal and the image signals to the data driver.

9. The display apparatus of claim 8, wherein the data processing part comprises:

a shift register configured to receive the data control signal and output a sampling signal;

an input register configured to receive the sampling signal, sequentially store the image signals and simultaneously output those image signals corresponding to a line of the display panel;

a latch configured to store and output the image signals corresponding to the line;

a level shifter configured to convert voltage levels of the image signals corresponding to the line and output the converted image signals;

a digital-to-analog converter configured to receive a gamma reference voltage and the converted image signals and output data voltages corresponding to the converted image signals; and an output buffer configured to receive and output the data voltages.

10. The display apparatus of claim 1, wherein the display panel comprises:

a first substrate on which the gate lines, the data lines, and the pixels are disposed;

a second substrate facing the first substrate; and a fluid layer including a first fluid layer and a second fluid layer, which are disposed between the first substrate and the second substrate and at least one of the first and second fluids has a color.

11. The display apparatus of claim 10, wherein each of the pixels comprises:

a switching device connected to a corresponding gate line of the gate lines and a corresponding data line of the data lines; and a pixel electrode connected to the switching device.

12. The display apparatus of claim 11, wherein the second substrate comprises a common electrode facing the pixel electrode, the pixel electrode receives the data signal through the switching device, and the common electrode receives the first voltage.

* * * * *